United States Patent

Ohara et al.

[11] Patent Number: 5,252,633
[45] Date of Patent: Oct. 12, 1993

[54] POLYARYLENE SULFIDE RESIN COMPOSITION

[75] Inventors: Shinji Ohara; Okihiro Morimoto; Nobumasa Suemura, all of Ube, Japan

[73] Assignee: Ube Industries, Ltd., Ube, Japan

[21] Appl. No.: 672,949

[22] Filed: Mar. 21, 1991

Related U.S. Application Data

[60] Division of Ser. No. 613,941, Nov. 8, 1990, Pat. No. 5,021,497, which is a continuation of Ser. No. 358,686, May 30, 1989, abandoned.

[30] Foreign Application Priority Data

Jun. 17, 1988 [JP] Japan ............................ 63-148022
Aug. 30, 1988 [JP] Japan ............................ 63-213727

[51] Int. Cl.$^5$ ................................................ C08K 9/10
[52] U.S. Cl. .................................... 523/210; 523/212; 523/214; 523/213; 524/436; 524/451; 524/609
[58] Field of Search .............. 523/210, 212, 214, 213; 524/436, 451

[56] References Cited

U.S. PATENT DOCUMENTS

| | | | |
|---|---|---|---|
| 4,189,194 | 2/1980 | Davies | 428/457 |
| 4,357,271 | 11/1982 | Rosenquist | 523/212 |
| 4,395,512 | 7/1983 | Kubota et al. | 524/424 |
| 4,504,551 | 3/1985 | Leland | 524/451 |
| 4,529,769 | 7/1985 | Johnson et al. | 524/407 |
| 4,588,789 | 5/1986 | Scoggins et al. | 525/537 |
| 4,596,736 | 6/1986 | Eichhorn et al. | 428/516 |
| 4,746,698 | 5/1988 | Kouyama et al. | 524/456 |
| 4,748,169 | 5/1988 | Izutsu et al. | 524/504 |
| 4,898,904 | 2/1990 | Yu et al. | 524/436 |

FOREIGN PATENT DOCUMENTS 0144987 6/1985 European Pat. Off. .
151648 9/1982 Japan .

Primary Examiner—John C. Bleutge
Assistant Examiner—Mark Sweet
Attorney, Agent, or Firm—Frishauf, Holtz, Goodman & Woodward

[57] ABSTRACT

A resin composition comprising a polyarylene sulfide resin and at least one metal hydroxide containing 50% by weight or more of magnesium hydroxide, wherein the metal hydroxide is subjected to a surface treatment with a fatty acid or a silane coupling agent prior to addition with the polyarylene sulfide resin; or the composition further comprises glass fibers and talc.

14 Claims, No Drawings

POLYARYLENE SULFIDE RESIN COMPOSITION

This is a division of application Ser. No. 07/613,941 filed Nov. 8, 1990, now U.S. Pat. No. 5,021,497, issued Jun. 4, 1991, which is a continuation of application Ser. No. 07/358,686 filed May 30, 1989 (now abandoned).

BACKGROUND OF THE INVENTION

This invention relates to a resin composition comprising a polyarylene sulfide resin and metal hydroxides composed mainly of magnesium hydroxide, and to a resin composition further comprising glass fibers and talc at specific compositional ratios. The composition of the present invention can give good surface appearance of molded articles, having excellent electrical characteristics such as arc resistance, etc. and can be used in wide fields, including electric, electronic parts and automobile parts.

Polyarylene sulfide resins as represented by polyphenylene sulfide resin (hereinafter sometimes abbreviated as PPS), which are excellent in heat resistance, chemical resistance, stiffness, dimensional stability, etc., have been attempted to be developed in recent years for applications in the fields where heat resistance and dimensional stability are required such as electric, electronic parts and automobile parts.

However, since said resin alone is inferior in impact resistance and mechanical strength, for the purpose of improving these properties, various proposals have been done concerning resin compositions comprising various inorganic substances formulated in said resin (e.g. Japanese Provisional Patent Publication No. 73275/1977 and Japanese Patent Publication No. 1553/1982). Further, particularly for the purpose of being used in electric, electronic parts or automobile parts, compositions improved in arc resistance have been proposed (e.g. Japanese Provisional Patent Publications No. 5252/1978, No. 162752/1979 and No. 131653/1984).

Of the inorganic substances to be used for this purpose, there have been made some proposals for the purpose of improving electrical characteristics such as arc resistance (e.g. Japanese Provisional Patent Publication No. 162752/1979). However, the inorganic substances which have been proposed up to date such as talc, clay, etc. are natural products, and are different depending on the places where they are produced and tended to be not constant in arc resistance, etc. Also, there is the method of effecting stabilization of the quality by calcining these, but the calcined product tended to be inferior in arc resistance, etc. as compared with those not calcined. Also, these exhibited a tendency that the inorganic fillers accumulate on the molded article surface to worsen the appearance of the molded article surface, when a large molded article is molded particularly by means of an injection molding machine. For this reason, it has been desired to improve the surface appearance of the molded article long with the characteristics such as arc resistance, etc. remaining as such.

SUMMARY OF THE INVENTION

An object of the present invention is to provide a polyarylene sulfide resin composition which is stably excellent in arc resistance, surface appearance of molded article, which has reduced the drawbacks observed in inorganic substances of the prior art as described above.

In order to accomplish the object of the present invention, various investigations have been done. As a consequence, it has been found that a hydrous inorganic compound having an appropriate dehydrating decomposition temperature is suitable for improvement of electrical characteristics such as arc resistance, and also that since a synthetic inorganic compound may be used for utilizing a product of stable quality, the object can be accomplished by formulating particulate, flaky or fibrous metal hydroxides composed mainly of magnesium hydroxide with specific sizes in a polyarylene sulfide resin, to accomplish the present invention. Further, it has been found that in order to obtain molded article which has sufficient mechanical strength and is excellent in surface appearance, a glass fiber, talc and magnesium hydroxide are formulated with a specific composition.

Thus, the object of the present invention can be accomplished by incorporating 5 to 300 parts by weight of metal hydroxides composed mainly of magnesium hydroxide per 100 parts by weight of a polyarylene sulfide resin, or by incorporating 20 to 120 parts by weight of glass fibers, 30 to 80 parts by weight of talc and 10 to 100 parts by weight of metal hydroxide per 100 parts by weight of a polyarylene sulfide resin.

DESCRIPTION OF THE PREFERRED EMBODIMENTS

The polyarylene sulfide resin to be used in the present invention should preferably comprise at least 70 mole % of p-phenylene sulfide units represented by the structural formula

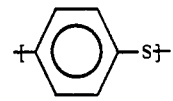

as the recurring units from the standpoints of heat resistance, chemical resistance, mechanical characteristics. With the p-phenylene sulfide units less than 70 mole %, heat resistance will be undesirably lowered As the components of 30% or less as the balance, there may be included m-phenylene sulfide bond

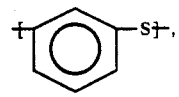

diphenyl ether bond

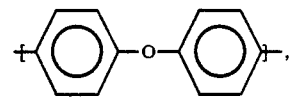

diphenylsulfone bond

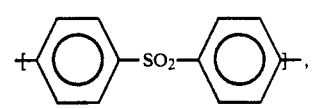

biphenyl bond

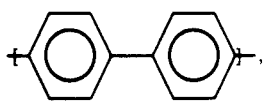

biphenyl sulfide bond

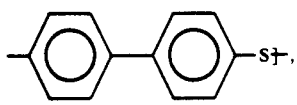

naphthyl sulfide bond

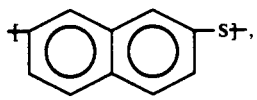

substituted p-phenylene sulfide bond

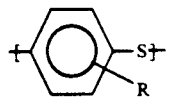

(wherein R is selected from the group consisting of an alkyl or an alkoxy group having up to 12 carbon atoms, a phenyl group and a nitro group), a trifunctional phenylsulfide bond, etc.

In the present invention, a polyarylene sulfide resin having the above structure, and also having a melt flow rate measured by a melt flow tester as defined by ASTM D 1238 under the conditions of 315° C., a load of 5 Kg of 5 to 10000 g/10 min, preferably 15 to 5000 g/10 min may be used. In the case of uses wherein flowability is particularly demanded, as the polyarylene sulfide resin, it is preferred to use a resin mixture obtained by mixing one having a flow rate under the above conditions of 5 to 300 g/10 min and one having a flow rate of 400 to 10000 g/10 min at a weight ratio of 5/95 to 95/5.

Specific examples of polyarylene sulfide resins may include Ryton (trade name of PPS resin, available from Phillips Petroleum Intl., Ltd.), TOHPREN (trade name of PPS resin, available from TOHPREN Co., Ltd.), FORTRON (trade name of PPS resin, available from Kureha Chemical Industry Co., Ltd.), SUSTEEL (trade name of PPS resin, available from Toso Susteel Co., Ltd.).

The metal hydroxides to be used in the present invention are mainly composed of magnesium hydroxide represented by the chemical formula of $Mg(OH)_2$ and they are synthetic inorganic substances containing 50% by weight or more, preferably 60 or more, more preferably 70 to 100% by weight, most preferably substantially 100% of magnesium hydroxide.

Specific examples of other metal hydroxides may include potassium hydroxide, aluminum hydroxide, barium hydroxide and the like.

The metal hydroxides are particulate, flaky or fibrous, and those to be used may be particulate with an average particle size of 0.1 μm to 10 μm, flaky with an average particle size of 0.1 to 10 μm, and fibrous with an average fiber diameter of 0.1 to 2 μm and an aspect ratio of 20 to 60, more preferably an average fiber diameter of 0.3 to 1 μm and an aspect ratio of 30 to 50.

Particulate or flaky metal hydroxides can be employed as inorganic fillers, but if the average particle size becomes smaller than 0.1 μm, miscibility with the polyarylene sulfide resin is worsened, whereby electrical characteristics become unstable and also mechanical strength is lowered. On the other hand, if the average particle size surpasses 10 μm, the surface appearance of the molded article will be worsened, and also electrical characteristics and mechanical strength will be undesirably lowered.

Flaky materials with a large aspect ratio (small average thickness relative to average particle size) can be also used as the reinforcing material.

Also, fibrous materials may be available as the reinforcing material, but if the average fiber diameter is smaller than 0.1 μm, miscibility with the polyarylene sulfide resin becomes poorer, whereby impact resistance will be lowered. On the other hand, if the average fiber diameter exceeds 2 μm, or the aspect ratio is greater than 60, the surface appearance of the molded article will be worsened with lowering in impact strength, and also electric characteristics will be affected thereby.

Of metal hydroxides composed mainly of a metal hydroxide other than magnesium hydroxide, those with a dehydrating decomposition temperature of 300° C. or lower such as aluminum hydroxide will suffer from dehydrating decomposition during mixing with the polyarylene sulfide resin or during molding of the polyarylene sulfide resin composition, whereby no expected characteristic can be exhibited. Also, those having extremely high dehydrating decomposition temperature such as calcium hydroxide (slaked lime) cannot exhibit the expected characteristic.

Specific examples of magnesium hydroxide may include KISUMA 5A and KISUMA 5B (both available from Kyowa Chemical Industries, Ltd.), D5 and D7L (both available from Ube Chemical Industries, Ltd.).

As the metal hydroxides composed mainly of magnesium hydroxide, it is preferred to use those which are subjected to the surface treatment with a fatty acid such as stearic acid, oleic acid, etc. and a salt thereof, stearyl alcohol, etc. The treatment amount with these may be preferably 0.05 to 3 parts by weight per 100 parts by weight of the metal hydroxides.

Further, those subjected to the surface treatment with a silane type coupling agent such as vinyltriethoxysilane, vinyltrichlorosilane, γ-glycidoxypropyltrimethoxysilane, γ-aminopropyltriethoxysilane, N-β-(aminoethyl)-γ-aminopropyltriethoxysilane, N-β-(aminoethyl)-γ-aminopropylmethyldiethoxysilane and the like may be used. The treatment amount may be preferably 0.05 to 3 parts by weight per 100 parts of metal hydroxides.

The formulation ratio of the polyarylene sulfide resin and the metal hydroxides composed mainly of magnesium hydroxide in the present invention may be 5 to 300 parts by weight of the metal hydroxides by 100 parts by weight of the polyarylene sulfide resin, more preferably 10 to 250 parts by weight, further preferably 10 to 100 parts by weight, most preferably 10 to 50 parts by weight of the metal hydroxides per 100 parts by weight of the polyarylene sulfide resin.

When the ratio of the metal hydroxides composed mainly of magnesium hydroxide exceeds 300 parts by weight, or the total amount together with other reinforcing materials or fillers exceeds 300 parts by weight, it becomes difficult to mix the polyarylene sulfide resin with magnesium hydroxide, whereby flexural strength, etc. may be lowered to give good resin composition with difficulty. On the other hand, with a ratio of less than 5 parts by weight of the metal hydroxides composed mainly of magnesium hydroxide per 100 parts by weight of the polyarylene sulfide resin, the mechanical strength will be remarkably lowered undesirably and surface appearance also becomes bad.

However, when other reinforcing materials or fillers are to be used in combination, it is desired that the total amount of the metal hydroxides and other reinforcing materials or fillers should not exceed 300 parts by weight per 100 parts by weight of the polyarylene sulfide resin.

The amount of the metal hydroxides composed mainly of magnesium hydroxide used may be within the range of 5% by weight or more, preferably 10 to 95% by weight, of the reinforcing materials and fillers to be used in the present invention. If the amount of the metal hydroxides used is less than this range, characteristics such as arc resistance cannot be exhibited undesirably.

The glass fibers to be used in the present invention preferably has a fiber diameter of 5 to 20 $\mu$m, particularly 6 to 15 $\mu$m, and a fiber length of 1.0 to 20 mm, particularly 1.5 to 6 mm. Those with a fiber diameter smaller than 5 $\mu$m can be kneaded with difficulty, and the fibers may be sometimes readily broken. Those with a fiber diameter greater than 20 $\mu$m may be inferior in mechanical strength of the composition. Those with a fiber length shorter than 1.0 mm will be lowered in mechanical strength of the composition. On the other hand, those with a fiber length longer than 20 mm may be sometimes kneaded with difficulty.

The glass fibers may be preferred those subjected to the surface treatment with 0.05 to 3 parts of a silane type coupling agent per 100 parts of the glass fibers. As the silane type coupling agent, the silane compounds as mentioned above can be used. It is also preferred to use glass fibers sheared with an appropriate amount of a urethane type and/or epoxy type sheafing agent.

The formulation ratio of the glass fibers may be within the range from 20 to 120 parts by weight, preferably from 40 to 100 parts by weight, per 100 parts by weight of the polyarylene sulfide resin. If it is less than 20 parts by weight, the mechanical strength is too inferior to stand practical application. On the other hand, if it is over 120 parts by weight, it also becomes too brittle to stand practical application.

In the present invention, arc resistance is exhibited with magnesium hydroxide alone or the combination of talc and magnesium hydroxide, and the formulation ratio of the case where talc and magnesium hydroxide are combinedly used may be 30 to 80 parts by weight, preferably 40 to 70 parts by weight of talc, and 10 to 100 parts by weight, preferably 15 to 40 parts by weight, of magnesium hydroxide, per 100 parts by weight of the polyarylene sulfide resin. Further, in the composition of the present invention, a preferred composition may comprise 50 to 180 parts by weight, particularly preferably 55 to 95 parts by weight of the total amount of talc and magnesium hydroxide per 100 parts by weight of the polyarylene sulfide resin. If the amount of the talc is too small, arc resistance will be inferior. If the amount of talc is too much, the composition obtained will become unduly brittle and the surface appearance of the injection molded article becomes bad. On the other hand, if the total amount of talc and magnesium hydroxide is too much, the composition may become sometimes brittle. Further, if the amount of magnesium hydroxide is too small, the surface appearance of the injection molded article will be remarkably poor.

The talc used here preferably has an average particle size of 0.1 $\mu$m to 10 $\mu$m. If the average particle size is smaller than 0.1 $\mu$m, miscibility with the polyarylene sulfide resin may be worsened, electrical characteristics may become unstable, or mechanical strength may be lowered in some cases undesirably. On the other hand, if the average particle size exceeds 10 $\mu$m, the surface appearance of the molded article may be worsened, the electrical characteristics also lowered and mechanical strength also lowered in some cases undesirably.

The talc used here is preferably subjected to the surface treatment with the surface treatment agent such as a fatty acid, e.g. stearic acid, oleic acid and salts thereof and/or a silane type coupling agent such as vinylethoxysilane, vinyltrichlorosilane, $\gamma$-glycidoxypropyltrimethoxysilane, $\gamma$-aminopropyltriethoxysilane, $\gamma$-methacryloxypropyltrimethoxysilane, N-$\beta$-(aminoethyl)-$\gamma$-aminopropyltriethoxysilane, N-$\beta$-(aminoethyl)-$\gamma$-aminopropylmethyldiethoxysilane and the like, for improvement of dispersibility of the composition. The treatment amount may be preferably 0.05 to 3 parts by weight per 100 parts by weight of the talc.

Specific examples of talc may include CHC-11P, CHC-13P and CHC-13A03 (all available from Hayashi Kasei Co., Ltd.), TALCUP (available from Fuji Talc Industrial Co., Ltd.), etc.

In the resin composition of the present invention, within the range which does not impair the object of the preset invention, there can be added at least one of additives, including antioxidants or thermal stabilizers such as hindered phenols, hydroquinone, thioether, phosphites and substituted derivatives of these, UV-ray absorbers such as resorcinol, salicylate, benzotriazole, benzophenone and others, mold release agents such as stearic acid and salts thereof, stearyl alcohol, etc., antistatic agents such as sodium dodecylbenzenesulfonate, polyalkylene glycol, etc., crystallization promotors, dyes, pigments, and so on.

Also, it is possible to add a small amount of a thermoplastic resin such as polyethylene, polypropylene, ethylenevinyl acetate copolymer, ethylene-propylene copolymer, polystyrene, polyamide, polyester, polyacetal, polycarbonate, polysulfone, polyphenylene ether, polyarylate, etc.; a thermosetting resin such as a phenol resin, a melamine resin, a silicone resin, an epoxy resin, etc.; or a thermoplastic elastomer such as a styrene-butadiene copolymer, a hydrogenated styrene-butadiene block copolymer, a polyester type elastomer, a polyamide type elastomer, etc.

Further, in the composition of the present invention, within the range which does not impair the object of the present invention, various reinforcing materials and fillers can be added. Specific examples of reinforcing materials and fillers may include asbestos fibers, carbon fibers, silica fibers, silica-alumina fibers, alumina fibers, zirconia fibers, boron nitride fibers, silicon nitride fibers, boron fibers, metal fibers such as of stainless steel, aluminum, titanium, copper, brass, magnesium, etc., and organic fibers such as polyamide fibers, fluorine resin fibers, polyester fibers, acrylic resin fibers, etc., metallic powder such as of copper, iron, nickel, zinc, tin, lead, stainless steel, aluminum, gold, silver, magnesium, etc., humid silica, aluminum silicate, glass beads, glass flakes, carbon black, quartz powder, talc, titanium oxide, iron oxide, calcium carbonate, diatomaceous earth, mica powder and so on. Of these, the fibrous materials may be used those having an average fiber diameter of 3 to 50 μm and a fiber length of 50 μm to 30 mm. Also, these reinforcing materials and fillers subjected to the surface treatment with known silane coupling agents or titanate type coupling agents can be used.

The resin composition of the present invention can be prepared by means of a conventional melting and kneading processing device such as continuous kneading machine, e.g. extruder, or batch system kneader, e.g. Banbury mixer, kneader, etc., and further can be processed into molded articles for various uses by way of injection molding, compression molding, extrusion molding, etc.

EXAMPLES

The present invention is described below by referring to Examples.

Measurements of arc resistance, volume resistivity, dielectric breakdown voltage, dielectric characteristics, flexural strength, flexural modulus, falling ball impact strength and molded article surface appearance were conducted according to the following methods.

1) Arc resistance:

According to ASTM D 495, the test was conducted by use of an arc resistance tester manufactured by Nissei Denki Seisakusho.

2) Volume resistivity:

According to ASTM D 257, volume resistivity was measured by a resistivity meter manufactured by Yokogawa Hewlett-Packard Co.

3) Dielectric breakdown voltage:

According to ASTM D 149, dielectric breakdown voltage was measured by a dielectric strength measuring device Model HAT-301 manufactured by Hitachi Chemical Co., Ltd.

4) Dielectric characteristics:

According to ASTM D 150, dielectric characteristics were measured by a dielectric member loss measuring device manufactured by Ando Electric Co., Ltd.

5) Flexural strength, Flexural modulus:

These were measured according to ASTM D 790 (unit: Kgf/cm$^2$).

6) Falling ball impact test:

This was measured by means of a high speed impact tester (TENSHIRON/UTM-5 Model, manufactured by Toyo Boldwin Co.).

| Measurement conditions: | |
|---|---|
| Missile head diameter: | 1 inch |
| Stand bore diameter | 60 mm |
| Stand bore angular curvature of radius | 2 mmϕ |
| Test speed | 2.5 m/sec |
| Test strip thickness | 2 mm |
| Measurement temperature | 23° C. |
| Humidity during measurement | 60% RH |

7) Molded article surface appearance:

A circular plate with a thickness of 3 mm and a diameter of 100 mm was injection molded and the surface was observed with eyes.

Examples 1-3, Comparative examples 1-5

TOHPREN T-4 (trade name, PPS resin available from TOHPREN Co., Ltd.), flaky magnesium hydroxide (KISUMA 5A, available from Kyowa Chemical Industries, Ltd.) and glass fibers (fiber length: 3 mm, fiber diameter: 13 μm) were charged at the formulation ratios shown in Table 1 into a twin screw extruder set at 310° C., melted and kneaded to prepare pellets. The pellets were used for preparation of various test strips by means of an injection molding machine under the conditions of a cylinder temperature of 300° C. and a cavity temperature of 150° C., and the physical properties were measured under predetermined conditions. Also, by using calcium carbonate (average particle size 5 μm), talc (produced in China, average particle size 5 μm), aluminum hydroxide (synthetic product, average particle size 5 μm), calcium hydroxide (150 mesh pass, available from Nippon Lime, Ltd.) in place of magnesium hydroxide, mixing, molding and measurement of physical properties were performed under the same conditions and compared with magnesium hydroxide. The results are shown in Table 1.

TABLE 1

| | Formulated composition | | | | | | Physical properties | | | | |
|---|---|---|---|---|---|---|---|---|---|---|---|
| | PPS parts by weight | Amounts of inorganic filler added parts by weight | | | | | Glass fibers amount added | Arc resistance sec | Volume resistivity Ω cm | Dielectric breakdown voltage kV/mm | Dielectric characteristics (1 MHz) | |
| | | Mg(OH)$_2$ | CaCO$_3$ | Talc | Al(OH)$_3$ | Ca(OH)$_2$ | | | | | ε | tanδ |
| Example 1 | 100 | 63 | — | — | — | — | 88 | 180 | $10^{16}$ | 15 | 4.6 | 0.001 |
| Example 2 | 100 | 86 | — | — | — | — | 100 | 200 | $10^{16}$ | 15 | 4.6 | 0.001 |
| Example 3 | 100 | 17 | — | — | — | — | 50 | 150 | $10^{16}$ | 14 | 4.1 | 0.001 |
| Comparative example 1 | 100 | — | 63 | — | — | — | 88 | 10 | $10^{16}$ | 15 | 4.6 | 0.001 |
| Comparative example 2 | 100 | — | — | 63 | — | — | 88 | 100 | $10^{16}$ | 15 | 4.2 | 0.004 |
| Comparative example 3 | 100 | — | — | 86 | — | — | 100 | 120 | $10^{16}$ | 15 | 4.3 | 0.004 |
| Comparative example 4 | 100 | — | — | — | 63 | — | 88 | 10 | $10^{16}$ | 15 | 4.6 | 0.001 |
| Comparative example 5 | 100 | — | — | — | — | 63 | 88 | 102 | $10^{16}$ | 15 | 4.6 | 0.001 |

Examples 4-6, Comparative example 6

TOHPREN T-4 (trade name, PPS resin available from TOHPREN Co., Ltd.), fibrous magnesium hydroxide (KISUMA 7, available from Kyowa Chemical Industries, Ltd.) and glass fibers (fiber length 3 mm, fiber diameter 13 μm) were charged at the formulation ratios shown in Table 2 into a twin screw extruder set at 310° C., melted and kneaded to prepare pellets. The pellets were used for preparation of various test strips by means of an injection molding machine under the conditions of a cylinder temperature of 300° C. and a cavity temperature of 150° C., and the physical properties were measured under predetermined conditions. The results are shown in Table 2.

TABLE 2

| | Formulated composition | | | | Physical properties | | | |
|---|---|---|---|---|---|---|---|---|
| | PPS parts by weight | Fibrous magnesium hydroxide | | | Glass fibers amount added | Arc resistance sec | Flexural strength kgf/cm$^2$ | Flexural modulus kgf/cm$^2$ | Falling ball impact test kgf/cm$^2$ |
| | | Amount added | Fiber diameter μM | Aspect ratio | | | | | |
| Example 4 | 100 | 50 | 0.8 | 40 | 100 | 180 | 2105 | 181000 | 51 |
| Comparative example 6 | 100 | 0 | — | — | 150 | 10 | 2130 | 185000 | 30 |
| Example 5 | 100 | 17 | 0.8 | 40 | 50 | 150 | 2020 | 180500 | 43 |
| Example 6 | 100 | 50 | 0.8 | 40 | 50 | 180 | 2110 | 184200 | 49 |

Examples 7-10, Comparative examples 7-10

TOHPREN T-4 (available from TOHPREN Co., Ltd.), talc 1 (average particle size: 5 μm, product treated with aminosilane compound), talc 2 (average particle size: 5μm, product treated with stearic acid), magnesium hydroxide (flaky, average particle size: 1.5μm, product treated with stearic acid), glass fibers (average fiber diameter: 13 μm, average fiber length: 3 mm, silane treated and sheafed product) were charged at the proportions shown in Table 3 into a twin extruder set at 310° C., melted and mixed to prepare pellets. The pellets were used for preparation of various test strips by means of an injection molding machine under the conditions of a cylinder temperature of 300° C. and a cavity temperature of 150° C., and evaluation was conducted under the predetermined conditions.

Also, without use of magnesium hydroxide (Comparative example 7), with the use of calcium, carbonate (average particle size: 1.8 μm) (Comparative example 8), aluminum hydroxide (synthetic product, average particle size: 1.5 μm) (Comparative example 9), and calcium hydroxide (150 mesh whole amount pass, available from Nippon Lime, Ltd.) (Comparative example 10) in place of magnesium hydroxide, mixing, molding and evaluation were conducted under the same conditions for comparison with the talc/magnesium system composition. The results are shown in Table 3.

According to the present invention, there can be provided a polyarylene sulfide resin composition which are excellent in electrical characteristics such as arc resistance, etc. while maintaining sufficient mechanical strength, high heat resistance as such, and can be utilized in the electric and electronic fields and the field of automobiles.

Further, according to the present invention, there can be provided a polyarylene sulfide resin composition which are provided with sufficient mechanical strength, high heat resistance and yet excellent in molded article appearance, and can be used in the electric and electronic fields and the field of automobiles.

We claim:

1. A resin composition comprising 100 parts by weight of a polyarylene sulfide resin and 10 to 100 parts by weight of at least one metal hydroxide containing 50% by weight or more of magnesium hydroxide, wherein said composition further comprises 20 to 120 parts by weight of glass fibers and 30 to 80 parts by weight of talc.

2. The resin composition according to claim 1, wherein said glass fibers have a fiber diameter of 5 to 20 μm and a fiber length of 0.1 to 20 mm.

3. The resin composition according to claim 1, wherein said glass fibers are subjected to a surface treatment with a silane coupling agent.

4. The resin composition according to claim 1, wherein said glass fibers are contained in an amount of 40 to 100 parts by weight.

5. The resin composition according to claim 1, wherein said talc has an average diameter of 0.1 to 10 μm.

6. The resin composition according to claim 1, wherein said talc is subjected to the surface treatment with a fatty acid or a silane type coupling agent.

TABLE 3

| | Formulated composition | | | | | | | Physical properties | | | |
|---|---|---|---|---|---|---|---|---|---|---|---|
| | PPS parts by weight | Amounts of inorganic filler added parts by weight | | | | | | Glass fibers amount added | Arc resistance sec | Flexural strength kgf/cm$^2$ | Flexural modulus × 10$^4$ kgf/cm$^2$ | Surface appearance |
| | | Talc 1 | Talc 2 | Mg(OH)$_2$ | CaCO$_3$ | Al(OH)$_3$ | Ca(OH)$_2$ | | | | | |
| Example 7 | 100 | 45 | — | 18 | — | — | — | 88 | 181 | 1350 | 17 | Good |
| Example 8 | 100 | 50 | — | 38 | — | — | — | 63 | 181 | 1450 | 17 | Good |
| Example 9 | 100 | 60 | — | 30 | — | — | — | 100 | 181 | 1320 | 19 | Good |
| Example 10 | 100 | — | 45 | 18 | — | — | — | 88 | 181 | 1320 | 17 | Good |
| Comparative example 7 | 100 | 63 | — | — | — | — | — | 88 | 181 | 1350 | 17 | *1 |
| Comparative example 8 | 100 | 45 | — | — | 18 | — | — | 88 | 150 | 1350 | 17 | *2 |
| Comparative example 9 | 100 | 45 | — | — | — | 18 | — | 88 | 150 | 1240 | 16 | *2 |
| Comparative example 10 | 100 | 45 | — | — | — | — | 18 | 88 | 150 | 1300 | 17 | *2 |

*1: White speckles appeared,
*2: White speckles slightly appeared.
*Talc 1 is aminosilane treated product and Talc 2 is stearic acid treated product.
Mg(OH)$_2$ and Al(OH)$_3$ are stearic acid treated products, and Ca(OH)$_2$ and CaCO$_3$ are non-treated produces.

7. The resin composition according to claim 1, wherein said talc is contained in an amount of 40 to 70 parts by weight.

8. The resin composition according to claim 2, wherein the polyarylene sulfide resin comprises at least 70 mole % of p-phenylene sulfide units of the structural formula

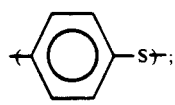

the glass fibers being subjected to a surface treatment with a silane coupling agent selected from the group consisting of vinyltriethoxysilane, vinyltrichlorosilane, γ-glycidoxypropyltrimethoxysilane, γ-aminopropyltriethoxysilane, N-β-(aminoethyl)-γ-aminopropylmethyldiethoxysilane and N-β-(aminoethyl)-γ-aminopropylmethyldiethoxysilane, said silane coupling agent being in an amount of 0.05 to 3 parts by weight of the metal hydroxide; the glass fibers being contained in an amount of 40 to 100 parts by weight; the talc having an average diameter of 0.1 to 10 μm.

9. The resin composition according to claim 5, wherein the polyarylene sulfide resin comprises at least 70 mole % of p-phenylene sulfide units of the structural formula

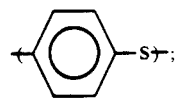

the talc being subjected to a surface treatment with a fatty acid selected from the group consisting of stearic acid, oleic acid and stearyl alcohol, said fatty acid being in an amount of 0.05 to 3 parts by weight of the metal hydroxide; the talc being contained in an amount of 40 to 70 parts by weight.

10. A resin composition comprising 100 parts by weight of a polyphenylene sulfide resin, 10 to 250 parts by weight of flaky magnesium hydroxide having an average particle size of 0.1 to 10 μm and an aspect ratio of 20 to 60, 20 to 120 parts by weight of glass fibers having a fiber diameter of 6 to 15 μm and a length of 1.5 to 6 mm.

11. The resin composition according to claim 10, wherein said composition comprises 100 parts by weight of a polyphenylene sulfide resin, 10 to 100 parts by weight of flaky magnesium hydroxide having an average particle size of 0.1 to 10 μm and an aspect ratio of 30 to 50, 40 to 100 parts by weight of glass fibers having a fiber diameter of 6 to 15 μm and a length of 1.5 to 6 mm.

12. A resin composition comprising 100 parts by weight of a polyphenylene sulfide resin, 10 to 250 parts by weight of flaky magnesium hydroxide having an average particle size of 0.1 to 10 μm and an aspect ratio of 20 to 60, 20 to 120 parts by weight of glass fibers having a fiber diameter of 6 to 15 μm and a length of 1.5 to 6 mm, and 30 to 80 parts by weight of talc having an average diameter of 0.1 to 10 μm.

13. The resin composition according to claim 12, wherein said composition comprises 100 parts by weight of a polyphenylene sulfide resin, 10 to 100 parts by weight of flaky magnesium hydroxide having an average particle size of 0.1 to 10 μm and an aspect ratio of 30 to 50, 40 to 100 parts by weight of glass fibers having a fiber diameter of 6 to 15 μm and a length of 1.5 to 6 mm, and 40 to 70 parts by weight of talc having an average diameter of 0.1 to 10 μm.

14. The resin composition according to claim 1, wherein said composition comprises 100 parts by weight of a polyphenylene sulfide resin, 18 parts by weight of magnesium hydroxide, 88 parts by weight of glass fiber and 45 parts by weight of talc.

* * * * *